United States Patent [19]
Fontana, Jr. et al.

[11] Patent Number: 5,164,869
[45] Date of Patent: Nov. 17, 1992

[54] MAGNETIC RECORDING HEAD WITH INTEGRATED MAGNETORESISTIVE ELEMENT AND OPEN YOKE

[75] Inventors: Robert E. Fontana, Jr., San Jose, Calif.; Lubomyr T. Romankiw, Briarcliff Manor, N.Y.; Mason L. Williams, III, San Jose, Calif.

[73] Assignee: International Business Machines Corporation, Armonk, N.Y.

[21] Appl. No.: 661,797

[22] Filed: Feb. 27, 1991

[51] Int. Cl.⁵ .............................................. G11B 5/127
[52] U.S. Cl. ........................................ 360/113; 360/126
[58] Field of Search ......................... 360/113, 125, 126

[56] References Cited

U.S. PATENT DOCUMENTS

| | | | |
|---|---|---|---|
| 3,921,217 | 11/1975 | Thompson | 360/113 |
| 4,300,177 | 11/1981 | Koel et al. | 360/113 |
| 4,566,050 | 1/1986 | Beam et al. | 360/113 |
| 4,698,711 | 10/1987 | Vinal | 360/113 |

Primary Examiner—A. J. Heinz
Attorney, Agent, or Firm—Otto Schmid, Jr.

[57] ABSTRACT

An integrated inductive write, magnetoresistive (MR) read thin film magnetic head comprising an open magnetic yoke having outside legs each having a winding thereon and a central leg having an opening across which the MR element is coupled. The outer legs are overlapped at one end to form confronting pole pieces having a transducing gap between the pole pieces, and the central leg is positioned between the pole pieces at one end and joined with the outer legs at the other end to form a symmetrical magnetic yoke structure. The windings are wound in a direction so that the flux produced by equally energizing the windings is equal and opposite in each of the outside legs, is additive at the transducing gap between the pole pieces, and produces no net flux through the central leg.

23 Claims, 8 Drawing Sheets

MAGNETIC RECORDING HEAD WITH INTEGRATED MAGNETORESISTIVE ELEMENT AND OPEN YOKE

FIELD OF THE INVENTION

This invention relates to magnetic heads for writing on and reading from magnetic recording media.

DESCRIPTION OF THE PRIOR ART

There are many alternative designs known in the prior art for integrated thin film magnetic heads in which an inductive head is used for writing and a magnetoresistive (MR) element is used for reading. In many of these designs the MR element is located at the air bearing surface (ABS), and a separate write structure is provided, the write gap of which is several microns from the read gap. As a result, should rotary actuators be used, track density can be limited by the misregistration of read and write tracks which varies with angle of the actuator.

It is therefore desirable to provide a design in which the read and write gaps are integrated in such a manner so that they are at the same place on a recording head. Having the MR element at the ABS is undesirable because it subjects electrical elements involved in signal generation to degradation in the event of contact between head and magnetic recording disk while power is applied to the MR element.

Integrated head designs are also known in which the MR element is located away from the ABS. For example, U.S. Pat. No. 4,300,177 shows an integrated head in which the MR element is across a gap in one leg of the yoke (FIG. 1) or in a magnetic path across the yoke (FIGS. 2 and 3).

Commonly assigned U.S. Pat. No. 4,698,711 describes a vertical twin-track read/write head in which write and read operations are integrated into a single pole. Flux is guided to the MR element by using one of the main poles of the write head so that the MR element is in the flux path for a write operation.

Commonly assigned U.S. Pat. No. 4,566,050 shows an MR read head for a hand-held magnetic reader in which a magnetic yoke has three legs and the MR element is interposed between two portions of the center leg of the magnetic yoke. The outer legs of the magnetic yoke are spaced apart a distance so that only one of the outer legs and the center legs is in position to read a recorded magnetic transition even when the plane of the MR element is skewed with respect to the magnetic transition.

The prior art integrated thin film magnetic heads have not been designed with reluctances of various elements chosen so that both the read and write efficiencies are over fifty percent, the problem being that, if the MR element effectively shunts the transducing gap, the reluctance of the MR element must be low for good read efficiency and high for good write efficiency.

SUMMARY OF THE INVENTION

It is therefore the principal object of this invention to provide an integrated thin film magnetic head in which the read and write circuits are essentially independent so that each can be designed to have a high efficiency.

In accordance with the invention, an integrated inductive write, magnetoresistive (MR) read thin film magnetic head comprises an open magnetic yoke having outside legs and a central leg. The outer legs are overlapped at one end to form confronting pole pieces having a transducing gap between the pole pieces, and the central leg is positioned between the pole pieces at one end and joined with the outer legs at the other end to produce a symmetrical magnetic yoke structure. An opening is provided in the central leg and a MR element is coupled across the opening. A winding is provided on each of the outside legs wound in a direction so that the flux produced by equally energizing the windings is equal and in opposite directions in each of the outside legs, is additive at the transducing gap between the pole pieces, and produces no net flux through the central leg. In a read operation, the magnetization is rotated in the MR element in response to magnetic fields being read at the transducing gap.

During a write operation, very little flux flows through the central leg due to the symmetry of the magnetic yoke so there is minimal disturbance of the read head by the write process. During a read operation, the signal flux in the central leg significantly rotates the magnetization in the MR element. Since the read and write circuits are essentially independent, each circuit can be designed to have a high efficiency.

The foregoing and other objects, features and advantages of the invention will be apparent from the following more particular description of a preferred embodiment of the invention as illustrated in accompanying drawings.

DESCRIPTION OF THE PREFERRED EMBODIMENTS

Figure 1:
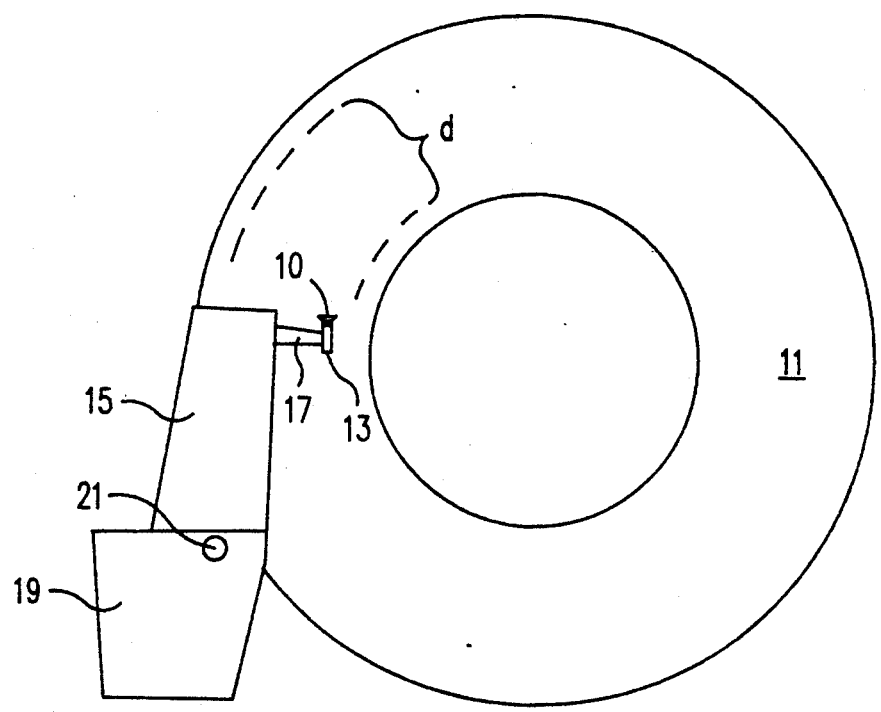
FIG. 1 is a simplified diagram of a magnetic disk file embodying the present invention.

The present invention is described as embodied in a magnetic disk file as shown in FIG. 1. At least one rigid rotatable magnetic disk 11 is supported on a spindle and rotated by a disk drive motor (not shown). The magnetic recording media on each disk is in the form of an annular pattern of concentric data tracks d as shown on disk 11.

As the disks rotate, the sliders are moved radially in and out so that the heads may access different portions of the disk surface containing the data. Each slider 13 supports one or more read/write head 10 and is attached to an actuator arm 15 by means of a suspension 17. The suspension 17 provides a slight spring force which biases the slider 13 against the disk surface. Each actuator arm 15 is attached to actuator means 19. The actuator means 19 shown schematically in FIG. 1 is a rotary actuator which is operable to move actuator arm 15 in a controlled manner about pivot point 21 as known in the art so that slider 13 and the associated read/write head 10 can be moved to a chosen one of the data tracks on magnetic recording medium 11.

During operation of the disk file, the rotation of the disk generates an air bearing between the slider 13 and the disk surface. The air bearing thus counterbalances the slight spring force of the suspension and supports the slider 13 off the disk surface during operation.

The above description of a typical disk file, and the accompanying illustration of it in FIG. 1 are for representative purposes only. It should be apparent that disk files may contain a large number of disks and actuators, and that each actuator may support a number of sliders.

Figure 2:
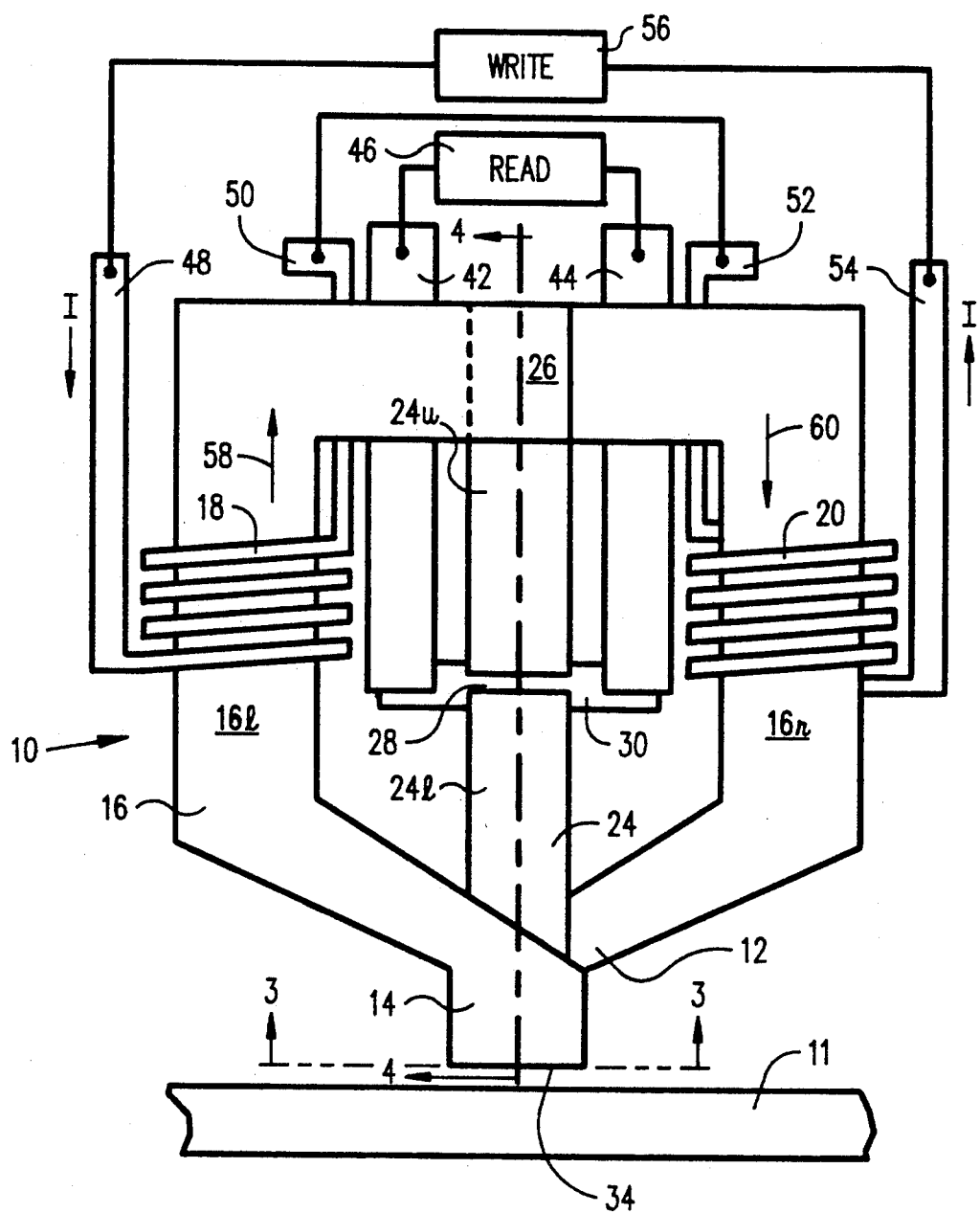
FIG. 2 is a plan view of a thin film magnetic head embodying the present invention.

Referring to FIG. 2 of the drawings, the thin film magnetic head 10, according to the present invention, comprises a first pole 12, a second pole 14 and magnetic yoke 16 which is contiguous with the second pole 14. A pair of coils 18 and 20 are wrapped helically about the magnetic yoke 16 and arranged so that a low reluctance magnetic circuit allows most of the magnetomotive potential applied by the coils 18, 20 to appear between first pole 12 and second pole 14 across a write gap 22. These elements provide a thin film magnetic write head with relatively low flux leakage between the two legs of the magnetic yoke 16 so that writing can be accomplished with high efficiency.

A flux guide 24 is centered in the gap 22 between first pole 12 and second pole 14 and forms a relatively low reluctance path along the center of the magnetic yoke 16 between the coils 18, 20 and flux guide 24 extends to the center of the yoke 16 on the end 26 of the yoke 16 which is opposite the write gap 22. A gap 28 is provided in flux guide 24 at a position remote from write gap 22, and a magnetoresistive (MR) element 30 is positioned across gap 28 so that the signal flux in the flux guide 24 enters MR element 30 and significantly rotates the magnetization in the MR element 30.

Figure 3:
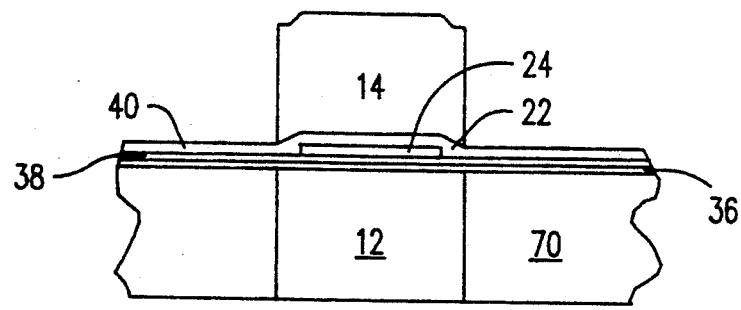
FIG. 3 is a section view taking along lines 3—3 of FIG. 2.

In operation, the thin film magnetic head 10 is positioned closely adjacent to the magnetic recording medium 11 which may comprise a magnetic disk or tape, for example. The separation between the air bearing surface (ABS) 34 of the magnetic head 10 and the magnetic recording medium 11 is maintained by an air bearing formed during relative motion between the magnetic head 10 and the magnetic recording medium 11 to a spacing of a few microinches, for example. The structure of the magnetic head 10 at the ABS 34 (FIG. 3) comprises first pole 12 and second pole 14 separated by the write transducing gap 22. In the embodiment shown, write transducing gap 22 is formed by first and second gap insulation layers 36, 38, the flux guide 24, and a third gap insulation layer 40.

Figure 4:
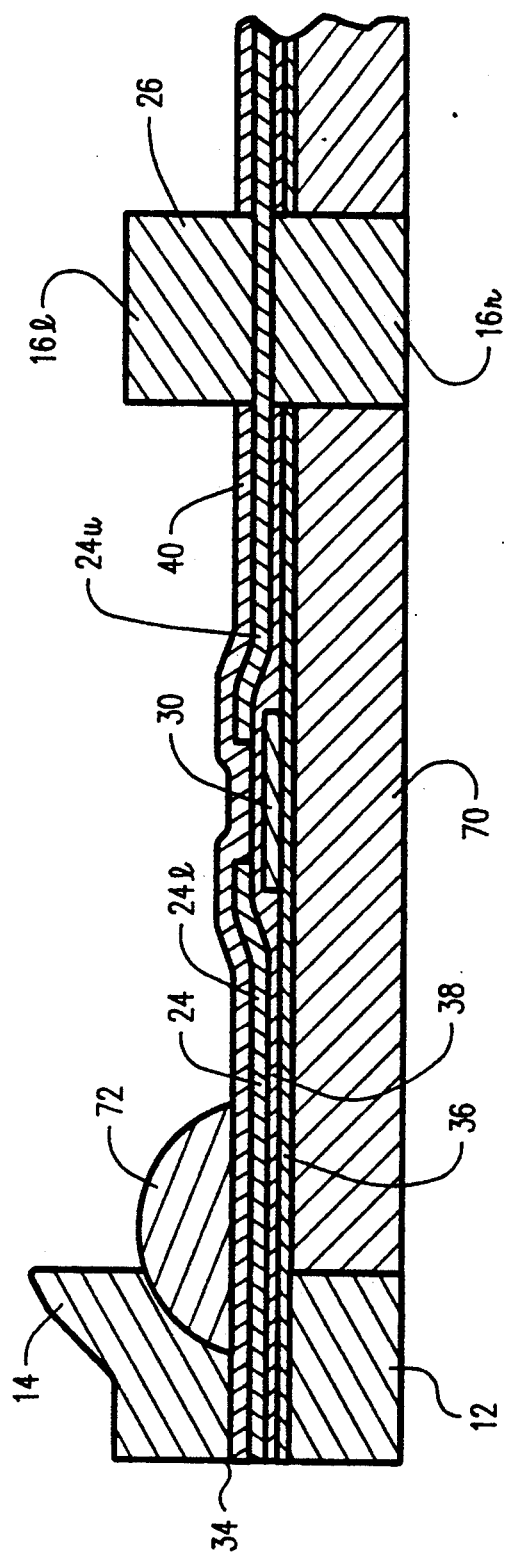
FIG. 4 is a section view taken along lines 4—4 of FIG. 2.
Figure 6:
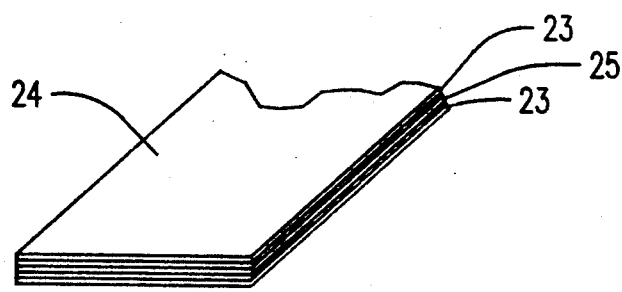
FIG. 6 is a view showing another embodiment of the flux guide.
Figure 5:
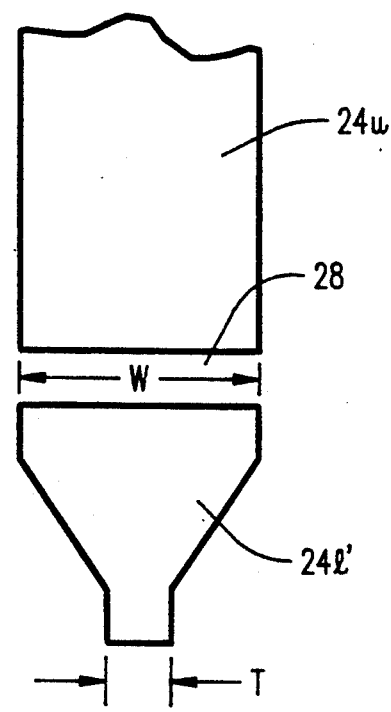
FIG. 5 is a view showing an alternate embodiment of the flux guide.
Figure 7:
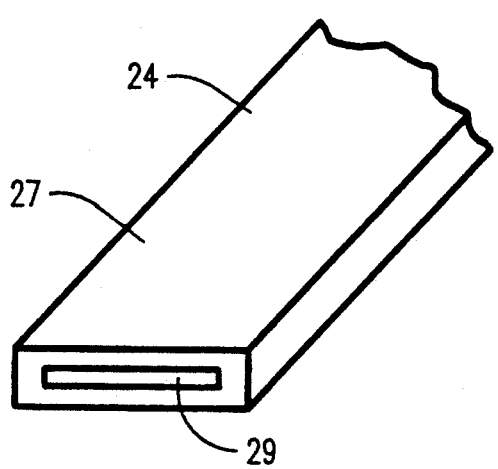
FIG. 7 is a view showing a further embodiment of the flux guide.

The lower part 24l of flux guide 24 extends from the ABS 34 to gap 28, and the upper part 24u of flux guide 24 extends from gap 28 to the end 26 of magnetic yoke 16. Flux guide parts 24l and 24u are both shown in FIG. 2 as having parallel sides. However, the lower part 24l' (FIG. 5) can be tapered from a width W at gap 28 to a narrower width T at ABS/34 to more easily accommodate narrow track applications. In addition, flux guide parts 24l and 24u are both shown in FIGS. 3 and 4 as comprising a single layer of magnetic material. However, flux guide parts 24l and 24u may comprise a laminated structure as shown in FIG. 6. The flux guide parts 24l and 24w comprise alternate thin layers of a ferromagnetic material 23 and a non-magnetic material 25. Flux guide parts 24l and 24w may also comprise a closed flux structure (FIG. 7) in which the ferromagnetic material 27 has edge closures around the non-magnetic material 29. The legs 16r and 16l of the magnetic yoke may also be produced with a laminated or flux closed structure, if desired.

The MR element 30 (FIGS. 2 and 3) is normal to flux guide 24 so that the direction of current flow in the MR element is essentially parallel to the ABS 34, and the MR element is separated from flux guide 24 by the second gap insulation layer 38. Electrical conductor leads 42, 44 provide electrical contact to MR element 30, and READ control circuits 46 are coupled across conductor leads 42, 44. Although MR element 30 is shown as comprising a single layer, it is known in the art that the MR layer 30 may comprise other layers as well, such as biasing layers, for example. In addition, the MR element may require more than two conductor leads.

Figure 8:
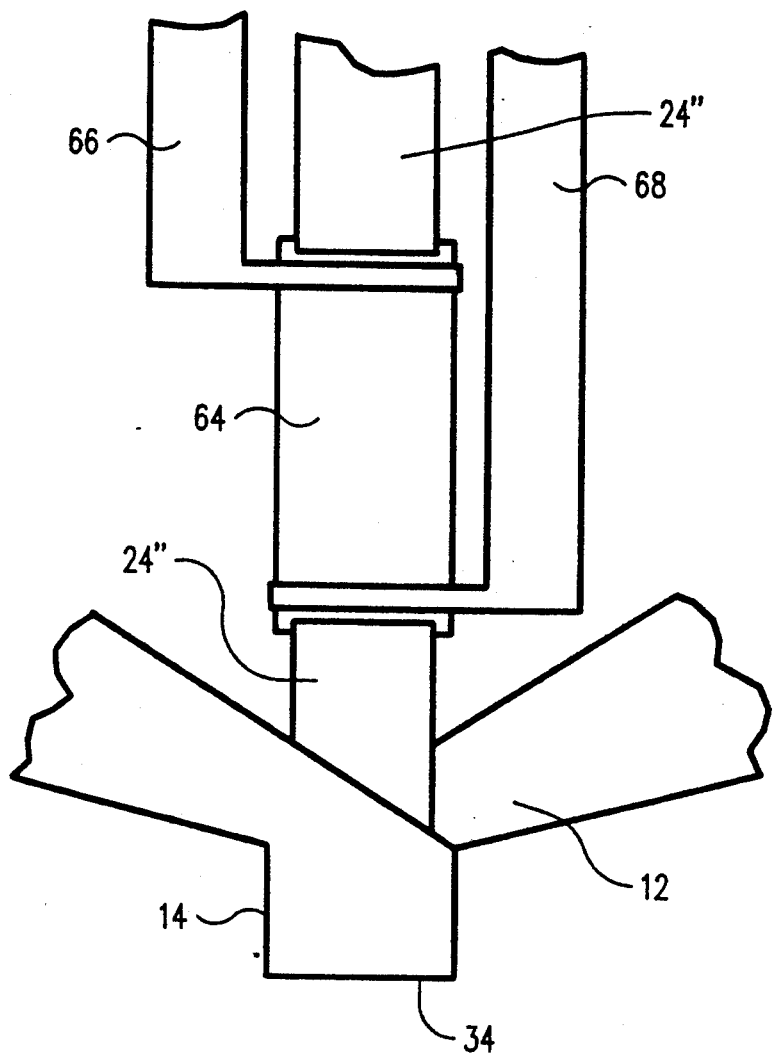
FIG. 8 is a view showing an alternate embodiment of the magnetoresistive element.

In the embodiment shown in FIG. 2 the MR element 30 and electrical conductor leads 42 and 44 are arranged so that current flows substantially normal to the flux guide 24 through the MR element 30. This arrangement is suitable for many applications. However, as track widths become narrower, the embodiment shown in FIG. 8 becomes increasingly more desirable. In this embodiment, the MR element 64 is elongated in a direction along the flux guide 24". The electrically conducting leads 66 and 68 are arranged so that the current flow through the MR element 64 is substantially parallel to the flux guide 24". This arrangement provides increased squares of resistance for narrow track applications.

Magnetic yoke 16 is defined as an open yoke since the two legs 16l and 16r are, for most of their length, displaced in the direction which would be the cross track direction when the magnetic head 10 is in use. In a preferred embodiment, the distance between the opposite legs 16l and 16r of the magnetic yoke 16 is more than 100 times the write gap 22 length for a majority of the length of the magnetic yoke 16. Coils 18 and 20 are fabricated helically about the legs 16l and 16r respectively of the magnetic yoke 16.

Figure 9:
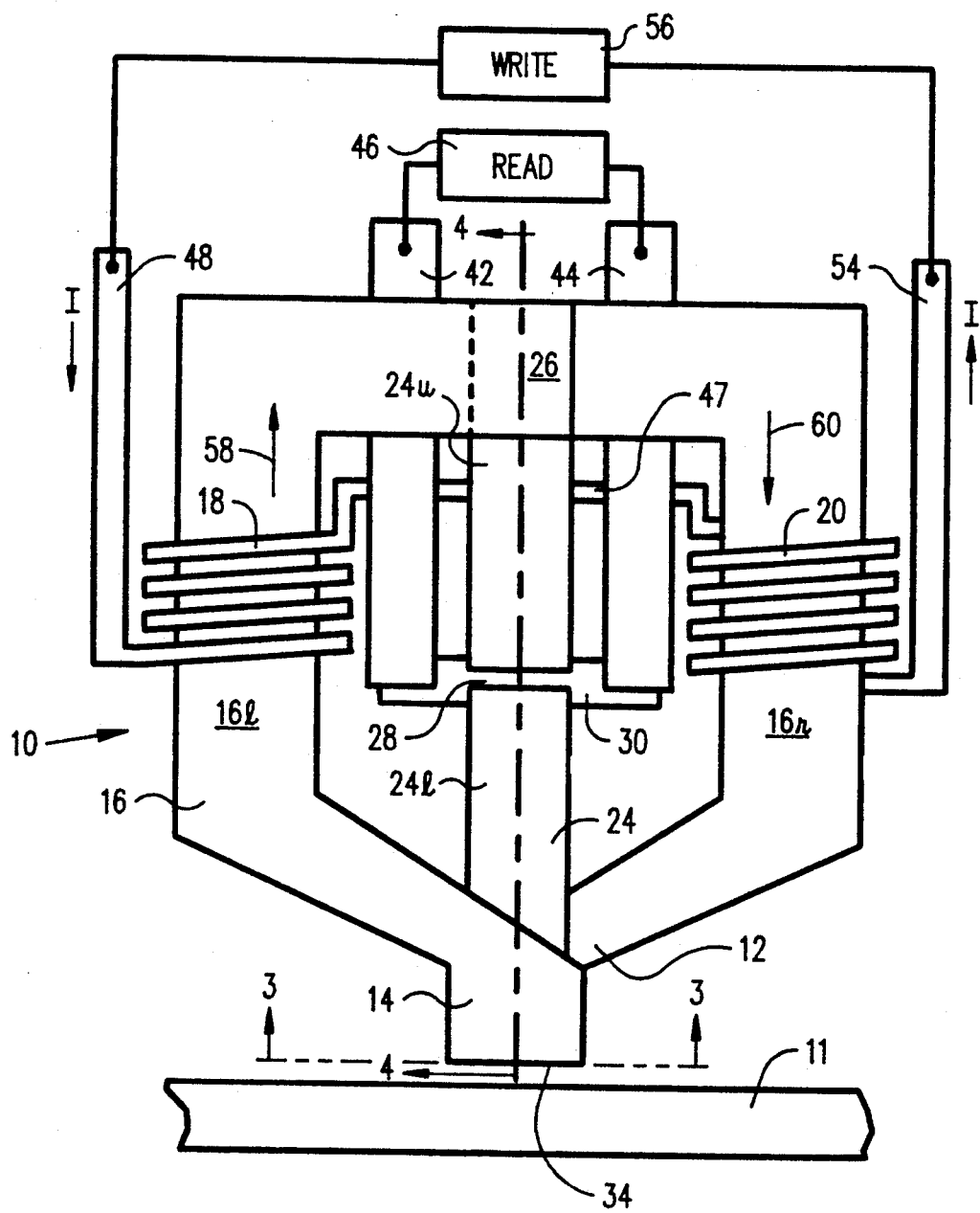
FIG. 9 is plan view of the thin film magnetic head showing an alternate embodiment of the coils.

Each of the coils 18 and 20 are provided with two electrical leads 48, 50 and 52, 54 respectively, and the sense of winding of the coils 18, 20 on legs 16l and 16r magnetic yoke 16 is opposite. By connecting WRITE control circuits 56 across electrical leads 48 and 54 and connecting electrical leads 50 and 52 together, a WRITE current I produces a flux in the direction of arrow 58 in leg 16l of magnetic yoke 16 and produces a flux in the direction of arrow 60 in leg 16r of magnetic yoke 16. This flux provides a substantial magnetomotive potential difference between first pole 12 and second pole 14 which provides an efficient WRITE process. In the WRITE process, to the first order, no WRITE flux flows through the flux guide 24 due to the symmetry of the magnetic yoke 16, so there is minimal disturbance of the read head by the WRITE process. Equivalent operation can be obtained by connecting the two coils together internally as shown in FIG. 9 in which conductor 47 is deposited to connect coils 18 and 20.

Figure 10:
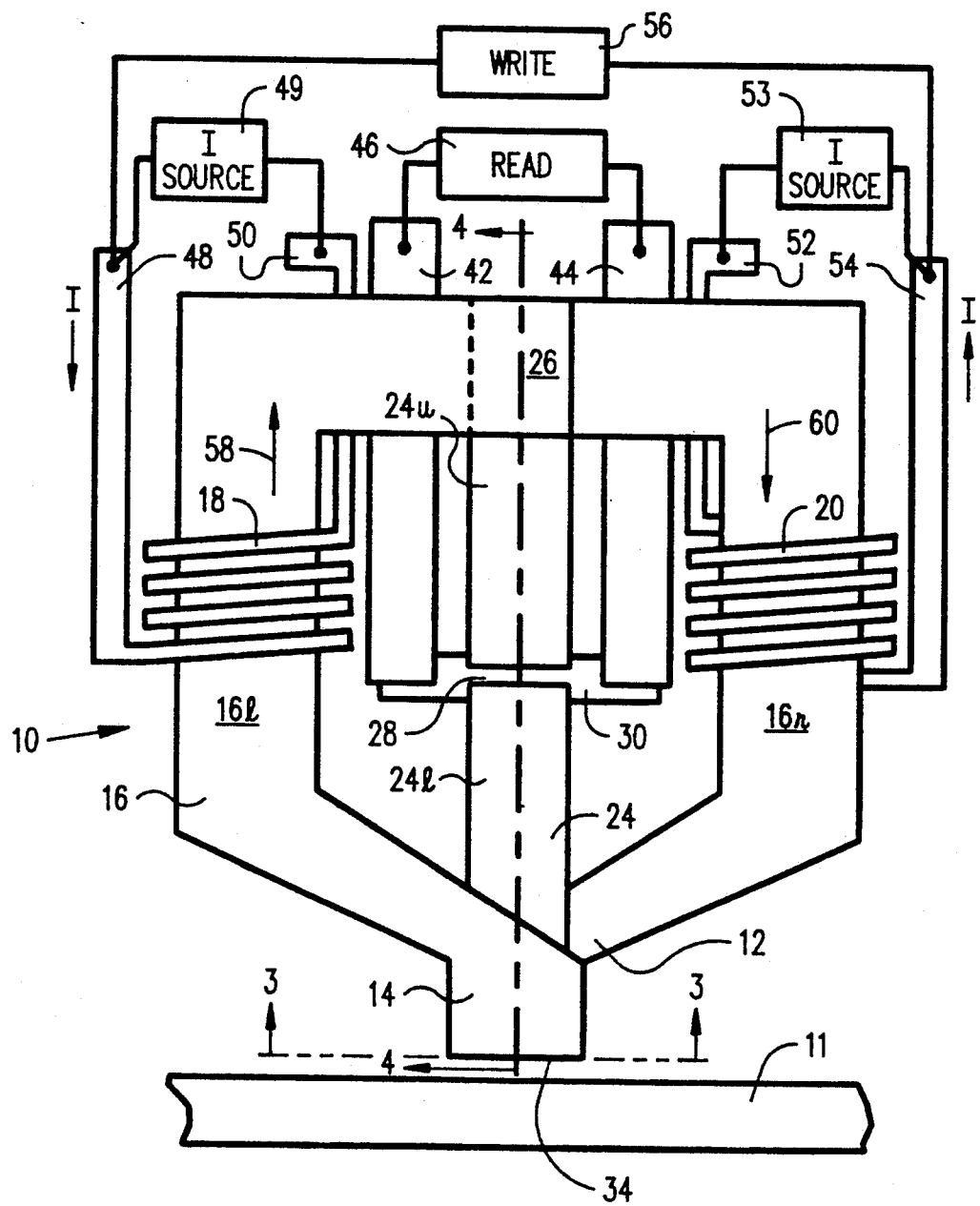
FIG. 10 is a plan view of the thin film magnetic head showing a further embodiment of the coils.

In a READ operation, a sense current from READ control circuits 46 is passed through electrical leads 42 and 44 through the MR element 30. The sense current magnitude is selected at a level which provides a bias so that the MR element 30 is biased to a linear part of its resistance vs. magnetic flux characteristics curve. Alternatively, biasing of the MR element 30 may be by means of a current of a chosen low level magnitude in coils 18 and 20. In the embodiment shown in FIG. 10, biasing of the MR element may be produced by means of a current of a chosen low level magnitude in coil 18 and 20. A first current source 49 is connected across terminals 48 and 50, and a second current source 53 is connected across terminals 52 and 54. During a WRITE operation both current sources 49 and 53 produce a current I so that there is no net flux in the central leg of the magnetic yoke. During a READ operation current source 49 produces a current i and current source 53 produces a current −i so that the resulting flux is additive in the center leg of magnetic yoke 16 where flux guide 24 is located. The level of current i utilized for this biasing technique is sufficiently small that the previously recorded data is not disturbed. Signals produced by resistance variation of the MR element 28 due to data previously recorded on recording medium 11 are sensed by the READ control circuits 46 as is conventionally practiced for MR sensing.

Figure 11:
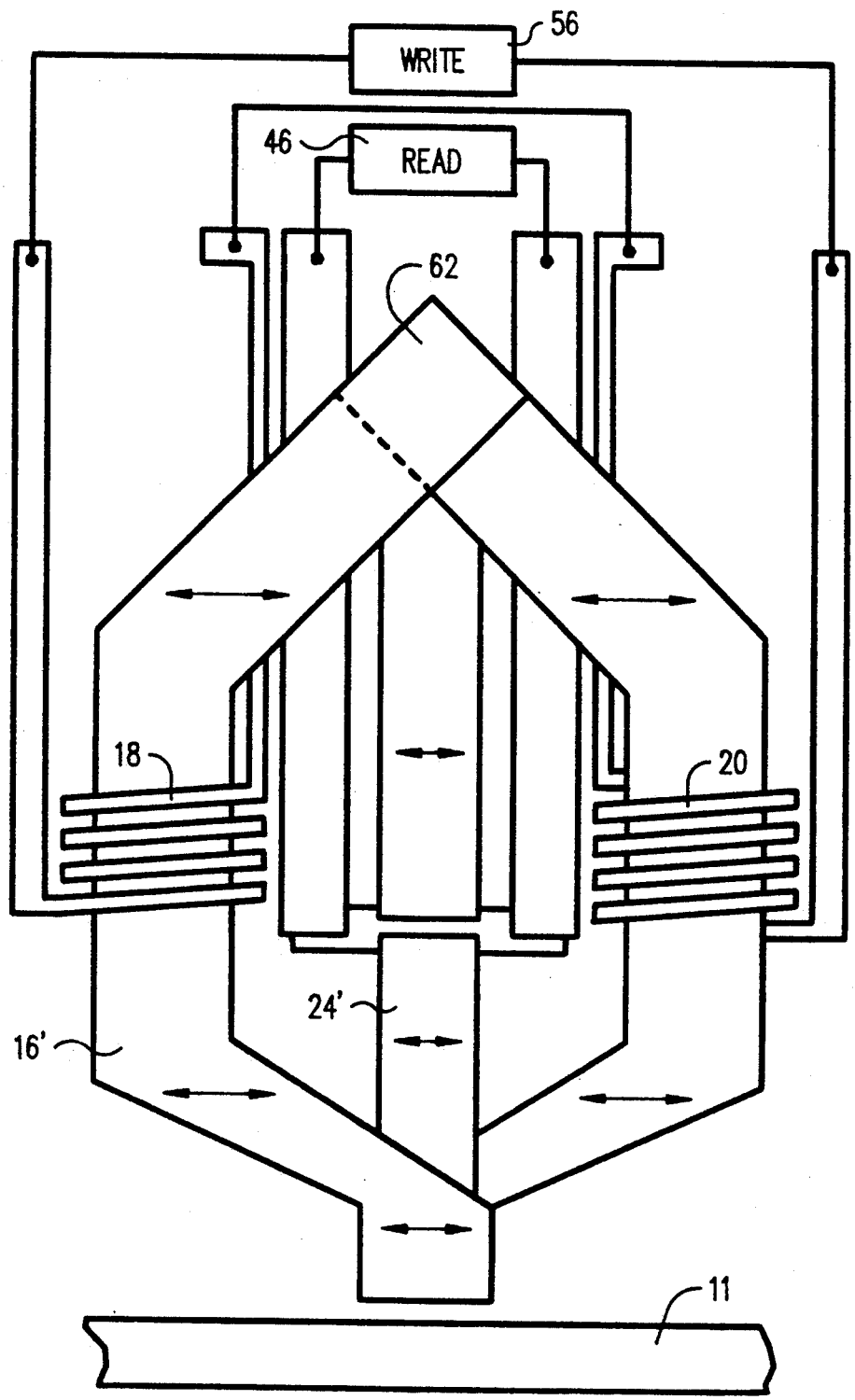
FIG. 11 is a plan view of an alternate embodiment of the thin film magnetic head embodying the present invention.

An alternate embodiment of the thin film magnetic head is shown in FIG. 11, and this is currently the preferred embodiment. In this embodiment the basic head structure remains the same as the FIG. 2 embodiment. However, the back closure 62 of the magnetic yoke 16' is in the form of an inverted V with easy axis orientation as shown by the arrows in FIG. 11. The easy axis orientation is established by applying a suitable magnetic field in the direction of the arrows during the deposition of the magnetic material which forms the magnetic yoke 16' and the flux guide 24'. The same variations in connections to the coils can be made as described above with respect to the FIG. 2 embodiment.

The thin film magnetic head 10 is fabricated by the use of suitable deposition and patterning techniques that are known in the art. The bottom layer of the coils is deposited first. This is followed by a layer of insulation, either dielectric material such as alumina or hard baked resist. This layer electrically insulates the coils from the yoke structure. The part of the magnetic yoke which comprises first pole 12 and extends to the straight leg 16r is deposited next, followed by the deposition of an insulator layer 70 to provide a planar surface for the deposition of the other head components. The flux guide 24, the MR layer 30, and the electrical leads are deposited, along with the appropriate insulating layers prior to the deposition of the remainder of the magnetic yoke. The insulating layers include hard baked resist to insulate the coils 18, 20 and a mound 72 (FIG. 4) to define the zero throat position. Suitably patterned dielectric, insulating material such as alumina may also be used.

The remainder of the magnetic yoke 16 is then deposited and this includes the second pole 14 and a contiguous structure which comprises leg 16l, back closure 26, and leg 16r which is deposited directly contacting the previously deposited layer of magnetic material which extends to first pole 12. After the deposition of suitable insulating material, vias are opened to the bottom coil layer so that the top coil layer can be deposited to provide electrical contact with the bottom coil layer and produce a coil 18 helically wrapped about leg 16l of the magnetic yoke and coil 20 helically wrapped about leg 16r of the magnetic yoke.

While the invention has been particularly shown and described with reference to a preferred embodiment thereof, it will be understood by those skilled in the art that various other changes in the form and details may be made therein without departing from the spirit and scope of the invention.

We claim:

1. An integrated inductive write, magnetoresistive read thin film magnetic head comprising:
   an open magnetic yoke having outside legs and a central leg, said outer legs being overlapped at one end to form confronting pole pieces having a transducing gap between said pole pieces, said central leg having an opening and being positioned between said pole pieces at said one end and joined with said outer legs at the other end to produce a symmetrical yoke structure;
   a magnetoresistive element coupled across said opening in said central leg; and
   a winding on each of said outside legs wound in a direction so that flux produced by equally energizing said windings is equal and in opposite directions in each of said outside legs.

2. The integrated thin film magnetic head of claim 1 wherein said magnetoresistive element is elongated in a direction substantially normal to said central leg of said magnetic yoke.

3. The integrated thin film magnetic head of claim 1 wherein said magnetoresistive element is elongated in a direction substantially parallel to said central leg of said magnetic yoke.

4. The integrated thin film magnetic head of claim 1 wherein said magnetic yoke has a back closure in a direction opposite to said transducing gap.

5. The integrated thin film magnetic head of claim 4 wherein said back closure is in the shape of an inverted V.

6. The integrated thin film magnetic head of claim 5 wherein said magnetic yoke is oriented with an easy axis in a direction substantially normal to said central leg of said magnetic yoke.

7. The integrated thin film magnetic head of claim 1 wherein said outside legs of said magnetic yoke are spaced apart a distance at least 100 times the transducing gap length.

8. The thin film magnetic read/write head of claim 1 wherein a nonmagnetic spacer member established the zero throat position at which said magnetic yoke legs start to diverge.

9. The thin film magnetic read/write head of claim 1 wherein at least part of said magnetic yoke comprises a laminated structure having alternate layers of a ferromagnetic material separated by layers of nonmagnetic material.

10. The thin film magnetic read/write head of claim 1 wherein at least a part of said magnetic yoke comprises a ferromagnetic material which is closed on all sides of nonmagnetic material.

11. A magnetic recording system comprising:
   a magnetic recording medium having a plurality of tracks for the recording of data;
   an integrated thin film magnetic head maintained in a closely spaced position relative to said magnetic recording medium during relative movement between said magnetic head and said magnetic recording member, said magnetic head further comprising:

an open magnetic yoke having outside legs and a central leg, said outer legs being overlapped at one end to form confronting pole pieces having a transducing gap between said pole pieces, said central leg having an opening and being positioned between said pole pieces at said one end and joined with said outer legs at the other end to produce a symmetrical yoke;

a magnetoresistive element coupled across said opening in said central leg; and a winding on each of said outside legs wound in a direction so that flux produced by equally energizing said windings is equal and in opposite directions in each of said outside legs;

actuator means connected to said magnetic head for moving said head to selected tracks on said medium;

means operable in response to a write cycle to produce a current signal of a predetermined level in each of said windings so that the resulting flux in said magnetic yoke is additive at said transducing gap between said pole pieces so that a magnetic pattern, representative of data, is recorded on said magnetic recording medium in an area adjacent said transducing gap; and means operable in response to a read cycle to rotate the magnetization in said magnetoresistive element in response to previously recorded magnetic fields being read at said transducing gap.

12. The system of claim 11 wherein said magnetoresistive element is elongated in a direction substantially normal to said central leg of said magnetic yoke.

13. The system of claim 11 wherein said magnetoresistive element is elongated in a direction substantially parallel to said central leg of said magnetic yoke.

14. The system of claim 11 wherein said magnetic yoke has a back closure in a direction opposite to said transducing gap.

15. The system of claim 14 wherein said back closure is in the shape of an inverted V.

16. The system of claim 15 wherein said magnetic yoke is oriented with an easy axis in a direction substantially normal to said central leg of said magnetic yoke.

17. The system of claim 11 wherein siid outside legs of said magnetic yoke are spaced apart a distance equal to at least 100 times the transducing gap length.

18. The system of claim 11 wherein said actuator means further comprises a rotary actuator.

19. The system of claim 11 wherein a nonmagnetic spacer member establishes the zero throat position at which said magnetic yoke legs start to diverge.

20. The system of claim 11 wherein at least a part of said magnetic yoke comprises a laminated structure having alternate layers of ferromagnetic material separated by layers of nonmagnetic material.

21. The system of claim 11 wherein at least a part of said magnetic yoke comprises a ferromagnetic material which is closed on all side of a nonmagnetic material.

22. The system of claim 11 wherein said windings on said outside legs are wound in opposite sense.

23. The system of claim 22 wherein said means operable in response to a read cycle comprises means for coupling a bias current i of opposite polarity to said windings so that the resulting magnetic flux is additive in said central leg of said magnetic yoke.

* * * * *